United States Patent
Gogic et al.

(10) Patent No.: US 9,148,866 B2
(45) Date of Patent: *Sep. 29, 2015

(54) METHOD AND APPARATUS FOR CREATING A FINGERPRINT FOR A WIRELESS NETWORK

(75) Inventors: Aleksandar Gogic, San Diego, CA (US); Manoj M. Deshpande, San Diego, CA (US); Nikhil Jain, San Diego, CA (US); Sanjiv Nanda, Ramona, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/460,657

(22) Filed: Apr. 30, 2012

(65) Prior Publication Data

US 2012/0220310 A1     Aug. 30, 2012

Related U.S. Application Data

(63) Continuation of application No. 11/501,128, filed on Aug. 7, 2006, now Pat. No. 8,169,982.

(60) Provisional application No. 60/753,259, filed on Dec. 21, 2005, provisional application No. 60/707,209, filed on Aug. 10, 2005.

(51) Int. Cl.
*H04W 4/00* (2009.01)
*H04W 64/00* (2009.01)
*G01S 5/02* (2010.01)
(Continued)

(52) U.S. Cl.
CPC ............ *H04W 64/00* (2013.01); *G01S 5/0252* (2013.01); *H04W 36/32* (2013.01); *H04W 48/08* (2013.01); *H04W 84/12* (2013.01); *H04W 88/06* (2013.01)

(58) Field of Classification Search
USPC ............. 455/456.1, 456.2, 456.3, 434, 435.2, 455/440, 455, 435.1
See application file for complete search history.

(56) References Cited

U.S. PATENT DOCUMENTS

| 4,707,841 A | 11/1987 | Yen et al. |
| 5,093,926 A | 3/1992 | Sasuta |

(Continued)

FOREIGN PATENT DOCUMENTS

| CN | 1129509 A | 8/1996 |
| CN | 1207859 A | 2/1999 |

(Continued)

OTHER PUBLICATIONS

Bender, P., et al., "CDMA/HDR: A Bandwidth-Efficient High-speed Wireless Data Service for Nomadic Users" IEEE Communications Magazine, IEEE Service Center, Piscataway, US, vol. 38, No. 7, Jul. 1, 2000, pp. 70-77, XP010091318.

(Continued)

*Primary Examiner* — Suhail Khan
(74) *Attorney, Agent, or Firm* — Fariba Yadegar-Bandari

(57) ABSTRACT

The disclosure is directed to a wireless communication device and method for using the device. The wireless communications device may be used by accessing information in memory, the information relating to a first communications network. The information, along with one or more reference signals from a second communications network, is used to determine whether the wireless communications device is in the vicinity of the first communications network.

16 Claims, 6 Drawing Sheets

(51) Int. Cl.
  *H04W 36/32* (2009.01)
  *H04W 48/08* (2009.01)
  *H04W 84/12* (2009.01)
  *H04W 88/06* (2009.01)

(56) References Cited

U.S. PATENT DOCUMENTS

| | | | |
|---|---|---|---|
| 5,640,677 | A | 6/1997 | Karlsson |
| 5,896,573 | A * | 4/1999 | Yang et al. ............... 455/453 |
| 5,983,097 | A | 11/1999 | Kakinuma et al. |
| 6,031,829 | A | 2/2000 | Dupuy et al. |
| 6,167,268 | A | 12/2000 | Souissi et al. |
| 6,529,491 | B1 | 3/2003 | Chang et al. |
| 6,539,491 | B1 | 3/2003 | Skergan et al. |
| 6,590,881 | B1 | 7/2003 | Wallace et al. |
| 6,621,811 | B1 * | 9/2003 | Chang et al. ................ 370/342 |
| 6,956,527 | B2 | 10/2005 | Rogers et al. |
| 6,983,156 | B2 | 1/2006 | Fukushima et al. |
| 6,999,778 | B2 | 2/2006 | DiBuduo |
| 7,020,111 | B2 | 3/2006 | Ozluturk et al. |
| 7,054,627 | B1 | 5/2006 | Hillman |
| 7,254,407 | B1 * | 8/2007 | Bokish ................ 455/456.3 |
| 7,263,370 | B1 | 8/2007 | Infosino |
| 7,289,541 | B2 | 10/2007 | Elam |
| 7,319,878 | B2 | 1/2008 | Sheynblat et al. |
| 7,340,278 | B2 | 3/2008 | Nakada |
| 7,346,321 | B2 | 3/2008 | Backes |
| 7,395,068 | B2 | 7/2008 | Syrjarinne |
| 7,433,694 | B2 | 10/2008 | Morgan et al. |
| 7,477,920 | B2 | 1/2009 | Scheinert et al. |
| 7,715,471 | B2 | 5/2010 | Werner et al. |
| 7,840,985 | B2 | 11/2010 | MacInnis |
| 8,045,638 | B2 | 10/2011 | Grant et al. |
| 8,169,982 | B2 | 5/2012 | Gogic et al. |
| 2002/0082044 | A1 | 6/2002 | Davenport |
| 2003/0008669 | A1 | 1/2003 | Stein et al. |
| 2003/0022686 | A1 | 1/2003 | Soomro et al. |
| 2003/0048758 | A1 | 3/2003 | Jones et al. |
| 2003/0118015 | A1 | 6/2003 | Gunnarsson et al. |
| 2003/0144006 | A1 | 7/2003 | Johansson et al. |
| 2003/0214937 | A1 | 11/2003 | Lindoff et al. |
| 2004/0071119 | A1 | 4/2004 | Ishikawa et al. |
| 2004/0147232 | A1 | 7/2004 | Zodnik |
| 2004/0162084 | A1 | 8/2004 | Wang |
| 2004/0166886 | A1 | 8/2004 | Laroia et al. |
| 2005/0009521 | A1 | 1/2005 | Preece |
| 2005/0018597 | A1 | 1/2005 | Yuda et al. |
| 2005/0037775 | A1 | 2/2005 | Moeglein et al. |
| 2005/0078033 | A1 | 4/2005 | Tamaki et al. |
| 2005/0090250 | A1 * | 4/2005 | Backes ................ 455/434 |
| 2005/0227689 | A1 | 10/2005 | Jewett |
| 2005/0246334 | A1 | 11/2005 | Tao et al. |
| 2005/0250496 | A1 * | 11/2005 | Hason et al. ............... 455/436 |
| 2005/0272444 | A1 | 12/2005 | Heffield et al. |
| 2006/0016850 | A1 | 1/2006 | Yoshie |
| 2006/0045134 | A1 | 3/2006 | Eldon et al. |
| 2006/0052067 | A1 * | 3/2006 | Singh et al. ............... 455/108 |
| 2006/0148486 | A1 | 7/2006 | Kim et al. |
| 2006/0234739 | A1 | 10/2006 | Thadasina et al. |
| 2007/0002813 | A1 | 1/2007 | Tenny et al. |
| 2007/0004428 | A1 | 1/2007 | Morgan et al. |
| 2007/0019586 | A1 | 1/2007 | Nanda et al. |
| 2007/0030956 | A1 | 2/2007 | Hornig |
| 2007/0053340 | A1 | 3/2007 | Guilford |
| 2007/0097938 | A1 | 5/2007 | Nylander et al. |
| 2007/0097939 | A1 | 5/2007 | Nylander et al. |
| 2007/0105527 | A1 | 5/2007 | Nylander et al. |
| 2007/0121560 | A1 | 5/2007 | Edge |
| 2007/0178914 | A1 | 8/2007 | Montenegro |
| 2007/0184185 | A1 | 8/2007 | Besinger et al. |
| 2007/0184845 | A1 | 8/2007 | Troncoso |
| 2007/0238448 | A1 | 10/2007 | Gallagher et al. |
| 2008/0153533 | A1 | 6/2008 | Claussen et al. |
| 2009/0034501 | A1 | 2/2009 | Hahm et al. |
| 2009/0061821 | A1 | 3/2009 | Chen et al. |
| 2009/0092111 | A1 | 4/2009 | Horn et al. |
| 2009/0098873 | A1 | 4/2009 | Gogic |
| 2009/0098885 | A1 | 4/2009 | Gogic et al. |
| 2009/0122773 | A1 | 5/2009 | Gogic |
| 2009/0156165 | A1 | 6/2009 | Raghothaman et al. |
| 2009/0163227 | A1 | 6/2009 | Collins |
| 2009/0221287 | A1 | 9/2009 | Balasubramanian et al. |
| 2010/0054206 | A1 | 3/2010 | Kalhan |
| 2010/0056177 | A1 | 3/2010 | Kojima |
| 2010/0069066 | A1 | 3/2010 | Shen et al. |
| 2010/0120394 | A1 | 5/2010 | Mia et al. |
| 2010/0130212 | A1 | 5/2010 | So et al. |
| 2010/0178916 | A1 | 7/2010 | Jamadagni |
| 2010/0240397 | A1 | 9/2010 | Buchmayer et al. |
| 2010/0246529 | A1 | 9/2010 | Ishizu et al. |
| 2010/0260052 | A1 | 10/2010 | Cho et al. |
| 2010/0304741 | A1 | 12/2010 | Gogic et al. |
| 2010/0329206 | A1 | 12/2010 | Thome et al. |
| 2011/0105128 | A1 | 5/2011 | Narasimha |
| 2011/0130115 | A1 | 6/2011 | Venkatachalam |
| 2011/0134833 | A1 | 6/2011 | Gogic |
| 2011/0170481 | A1 | 7/2011 | Gomes et al. |
| 2011/0205932 | A1 | 8/2011 | Ekici et al. |
| 2012/0015649 | A1 | 1/2012 | Li et al. |
| 2012/0106349 | A1 | 5/2012 | Adjakple et al. |
| 2012/0108199 | A1 | 5/2012 | Wang et al. |
| 2012/0122492 | A1 | 5/2012 | Zhou et al. |
| 2012/0142362 | A1 | 6/2012 | Mori |

FOREIGN PATENT DOCUMENTS

| | | |
|---|---|---|
| CN | 1215659 C | 8/2005 |
| CN | 1820521 A | 8/2006 |
| CN | 1894979 A | 1/2007 |
| CN | 101563947 A | 10/2009 |
| EP | 0865172 A2 | 9/1998 |
| EP | 0973271 A1 | 1/2000 |
| EP | 1037482 A2 | 9/2000 |
| EP | 1119137 A1 | 7/2001 |
| EP | 1298847 A1 | 4/2003 |
| EP | 1365613 A1 | 11/2003 |
| EP | 1739881 A1 | 1/2007 |
| EP | 1848125 | 10/2007 |
| GB | 2313257 A | 11/1997 |
| GB | 2389005 | 11/2003 |
| GB | 2398970 | 9/2004 |
| GB | 2446847 A | 8/2008 |
| JP | 10221425 A | 8/1998 |
| JP | 2003506960 A | 2/2003 |
| JP | 2003519995 T | 6/2003 |
| JP | 2004297121 A | 10/2004 |
| JP | 2004320473 A | 11/2004 |
| JP | 2004535575 T | 11/2004 |
| JP | 2005509136 A | 4/2005 |
| JP | 2005123662 A | 5/2005 |
| JP | 2006074468 A | 3/2006 |
| JP | 2006508603 A | 3/2006 |
| JP | 2006186551 A | 7/2006 |
| JP | 2007520146 A | 7/2007 |
| JP | 2009504018 A | 1/2009 |
| JP | 2009504019 A | 1/2009 |
| JP | 2009510973 A | 3/2009 |
| JP | 2010074779 A | 4/2010 |
| JP | 2010081118 A | 4/2010 |
| KR | 20080079946 A | 9/2008 |
| RU | 2113772 C1 | 6/1998 |
| RU | 2197780 C2 | 1/2003 |
| RU | 2296436 C2 | 3/2007 |
| RU | 2007134181 A | 3/2009 |
| RU | 2360378 C1 | 6/2009 |
| WO | 9501706 A1 | 1/1995 |
| WO | 9919743 A1 | 4/1999 |
| WO | 0075684 A1 | 12/2000 |
| WO | 0111804 A1 | 2/2001 |
| WO | 0115340 A1 | 3/2001 |
| WO | 0239759 A2 | 5/2002 |

(56) References Cited

FOREIGN PATENT DOCUMENTS

| WO | 02082832 | 10/2002 |
| WO | 03001687 A2 | 1/2003 |
| WO | 03010552 A2 | 2/2003 |
| WO | 03081939 A1 | 10/2003 |
| WO | 03100647 A1 | 12/2003 |
| WO | 03101138 A1 | 12/2003 |
| WO | 2004051887 A2 | 6/2004 |
| WO | 2004052041 A1 | 6/2004 |
| WO | 2004077753 A2 | 9/2004 |
| WO | 2005036836 A1 | 4/2005 |
| WO | 2005039214 A1 | 4/2005 |
| WO | 2005057834 A2 | 6/2005 |
| WO | WO-2005076656 A1 | 8/2005 |
| WO | 2005088991 A1 | 9/2005 |
| WO | 2007040449 A1 | 4/2007 |
| WO | 2007040454 A2 | 4/2007 |
| WO | 2007112559 A1 | 10/2007 |
| WO | 2008030956 A2 | 3/2008 |
| WO | 2008055251 | 5/2008 |
| WO | 2008076222 | 6/2008 |
| WO | 08109842 | 9/2008 |
| WO | 2008131588 | 11/2008 |
| WO | 2008131591 | 11/2008 |
| WO | 2008136416 | 11/2008 |
| WO | WO-2009108811 A1 | 9/2009 |
| WO | WO-2009116427 A1 | 9/2009 |
| WO | 2009120902 A1 | 10/2009 |

OTHER PUBLICATIONS

Dimitri Rubin and Todd Young: "Femtocells Bridging Reliable Location and Timing Indoors" INSIDEGNSS, vol . 3, No. 7, 2008, pp. 40-46, XP002520000 the whole document.
EE624 Mobile Communications Systems (MCS) in: Spread Spectrum Systems, Communication Networks Research Lab, (Fall 2000).
European Search Report—EP10012076—Search Authority—Berlin—Jun. 29, 2011.
International Search Report-PCT/US2006/031497, International Search Authority-European Patent Office—Feb. 13, 2007.
Partial European Search Report—EP10012076—Search Authority—Berlin—Jun. 29, 2011.
Taiwanese Search Report—095129423—TIPO—Jan. 24, 2010.
Written Opinion—PCT/US2006/031497, International Search Authority—European Patent Office—Feb. 13, 2007.
3GPP TS 25.133 V8.10.0 (Mar. 2010), 3rd Generation Partnership Project; Technical Specification Group Radio Access Network; Requirements for support of radio resource management (FDD) (Release 8), 236 pp.
Taiwan Search Report—TW099137508—TIPO—Jun. 25, 2013.
Universal Mobile Telecommunications, System (UMTS); Radio Resource Control, (RRC); Protocol specification (3GPP TS 25.331 version 9.1.0 Release 9), Technical Specification, European Telecommunications Standards Institute (ETSI), 650, Route Des Lucioles; F-06921 Sophia-Antipolis; France, vol. 3GPP RAN 2, No. V9.1.0, Feb. 1, 2010, XP014046584, p. 461-p. 467 p. 1684-p. 1685, paragraph 14.7a p. 1688, paragraph 14.11.1—p. 1690, paragraph 14.11.2.
Taiwan Search Report—TW099137508—TIPO—Dec. 16, 2013.

* cited by examiner

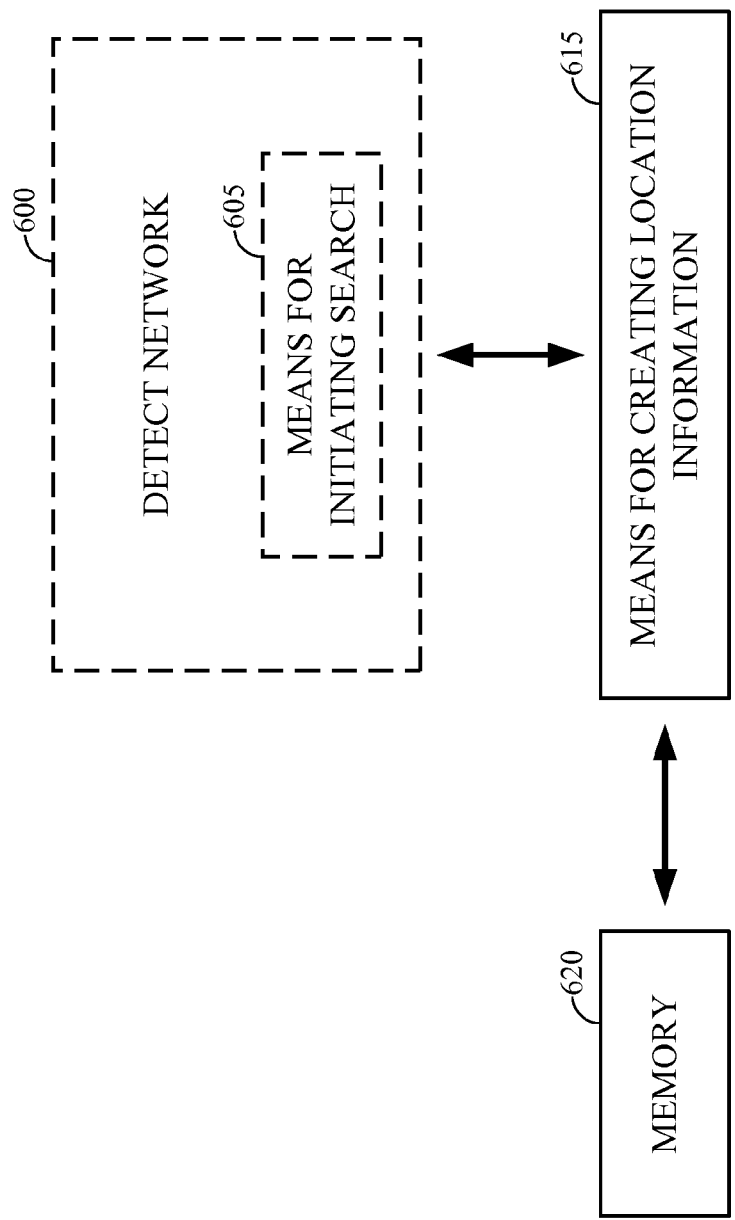

METHOD AND APPARATUS FOR CREATING A FINGERPRINT FOR A WIRELESS NETWORK

CLAIM OF PRIORITY UNDER 35 U.S.C. §119

The present Application for Patent is a continuation of non-provisional patent application Ser. No. 11/501,128 filed Aug. 7, 2006, which claimed priority to Provisional Application No. 60/707,209 entitled "ASSISTED WIRELESS NETWORK ACCESS POINT SEARCH IN WIRELESS COMMUNICATION NETWORKS" filed Aug. 10, 2005, and Provisional Application No. 60/753,259 entitled "METHOD AND APPARATUS FOR CREATING A FINGERPRINT FOR A WIRELESS NETWORK" filed Dec. 21, 2005, and assigned to the assignee hereof and hereby expressly incorporated by reference herein.

BACKGROUND

1. Field

The present disclosure relates generally to telecommunications, and amongst other things, to systems and methods to create a fingerprint for a wireless network.

2. Background

The demand for wireless information services has led to the development of an ever increasing number of wireless networks. CDMA2000 1x is just one example of a wireless network that provides telephony and data services. CDMA2000 1x is a wireless standard promulgated by the Third Generation Partnership Project 2 (3GPP2) using Code Division Multiple Access (CDMA) technology. CDMA is a technology that allows multiple users to share a common communications medium using spread-spectrum processing.

A competing wireless network that is commonly employed in Europe is Global System for Mobile Communications (GSM). Unlike CDMA2000 1x, GSM uses narrowband time division multiple access (TDMA) to support wireless telephony and data services.

Some other wireless networks include General Packet Radio Service (GPRS) which supports high speed data services with data rates suitable for e-mail and web browsing applications, and Universal Mobile Telecommunications System (UMTS) which can deliver broadband voice and data for audio and video applications.

These wireless networks can generally be thought of as Wide Area Networks (WAN)s that employ cellular technology. Cellular technology is based on a topology in which a geographic coverage region is broken up into cells. Within each of these cells is a fixed Base Transceiver Station (BTS) that communicates with mobile users. A Base Station Controller (BSC) is typically employed in the geographic coverage region to control the BTSs and to interface with the appropriate gateways to various packet-switched and circuit-switched networks.

As the demand for wireless information services continue to increase, mobile devices are evolving to support integrated voice, data, and streaming media while providing seamless network coverage between cellular WANs and wireless Local Area Networks (LAN)s. Wireless LANs generally provide telephony and data services over relatively small geographic regions using a standard protocol, such as IEEE 802.11, Bluetooth, Home RF, Ultra-Wideband (UWB), or the like. A LAN may be provided in an office building, home, or public place.

The existence of wireless LANs provides a unique opportunity to increase user capacity in a cellular WAN by extending cellular communications to the unlicensed spectrum using the infrastructure of the wireless LAN. However, precautions should be taken to prevent excess power consumption when the mobile device is searching for a wireless LAN. A continuous search for all wireless LANs in the vicinity of the mobile device may significantly reduce battery life because of the sheer number of different frequency bands that must be scanned. Moreover, some wireless LANs that may be found through a continuous search may be of no interest to the mobile device for a variety of reasons. Accordingly, there is a need in the art for a mobile device capable of locating wireless LANs in WAN with minimal search time.

SUMMARY

One aspect of a wireless communications device is disclosed. The wireless communications device includes a processor configured to create information relating to the location of a first communications network based on one or more reference signals from a second communications network, and memory configured to store the information.

Computer readable media embodying a program of instructions executable by a processor, or processors, to perform a method of communications is disclosed. The instructions may comprise instructions for creating information relating to the location of a first communications network based on one or more reference signals from a second communications network, and instructions for storing the information in memory.

A method of communications is disclosed. The method includes creating information relating to the location of a first communications network based on one or more reference signals from a second communications network, and storing the information in memory.

An apparatus for communications is disclosed. The apparatus includes means for creating information relating to the location of a first communications network based on one or more reference signals from a second communications network, and a memory that stores the information created by the means.

It is understood that other embodiments of the present disclosure will become readily apparent to those skilled in the art from the following detailed description, wherein it is shown and described only various embodiments of the disclosure by way of illustration. As will be realized, the disclosure is capable of other and different embodiments and its several details are capable of modification in various other respects, all without departing from the spirit and scope of the present disclosure. Accordingly, the drawings and detailed description are to be regarded as illustrative in nature and not as restrictive.

BRIEF DESCRIPTION OF THE DRAWINGS

Various aspects of a wireless communications system are illustrated by way of example, and not by way of limitation, in the accompanying drawings, wherein:

FIG. 6 is another simplified block diagram wireless communication device.

DETAILED DESCRIPTION

The detailed description set forth below in connection with the appended drawings is intended as a description of various embodiments of the disclosure and is not intended to represent the only embodiments in which the disclosure may be practiced. The detailed description includes specific details for the purpose of providing a thorough understanding of the disclosure. However, it will be apparent to those skilled in the art that the disclosure may be practiced without these specific details. In some instances, well known structures and components are shown in block diagram form in order to avoid obscuring the concepts of the disclosure.

In the following detailed description, various concepts will be described in the context of a wireless communications device searching for a wireless LAN in a cellular WAN. Specific examples of a wireless device capable of operation in a CDMA2000 1x network with IEEE 802.11 capability will be described, however, those skilled in the art will readily appreciate the principles in these examples can be extended to other wireless devices capable of accessing multiple networks. By way of example, a wireless device may be configured to search for WCDMA networks that overlay a GSM network. Accordingly, any reference to a cellular CDMA device capable of communicating with an IEEE 802.11 network, or any other specific embodiment, is intended only to illustrate various aspects of the present disclosure, with the understanding that these aspects have a wide range of applications.

Figure 1:
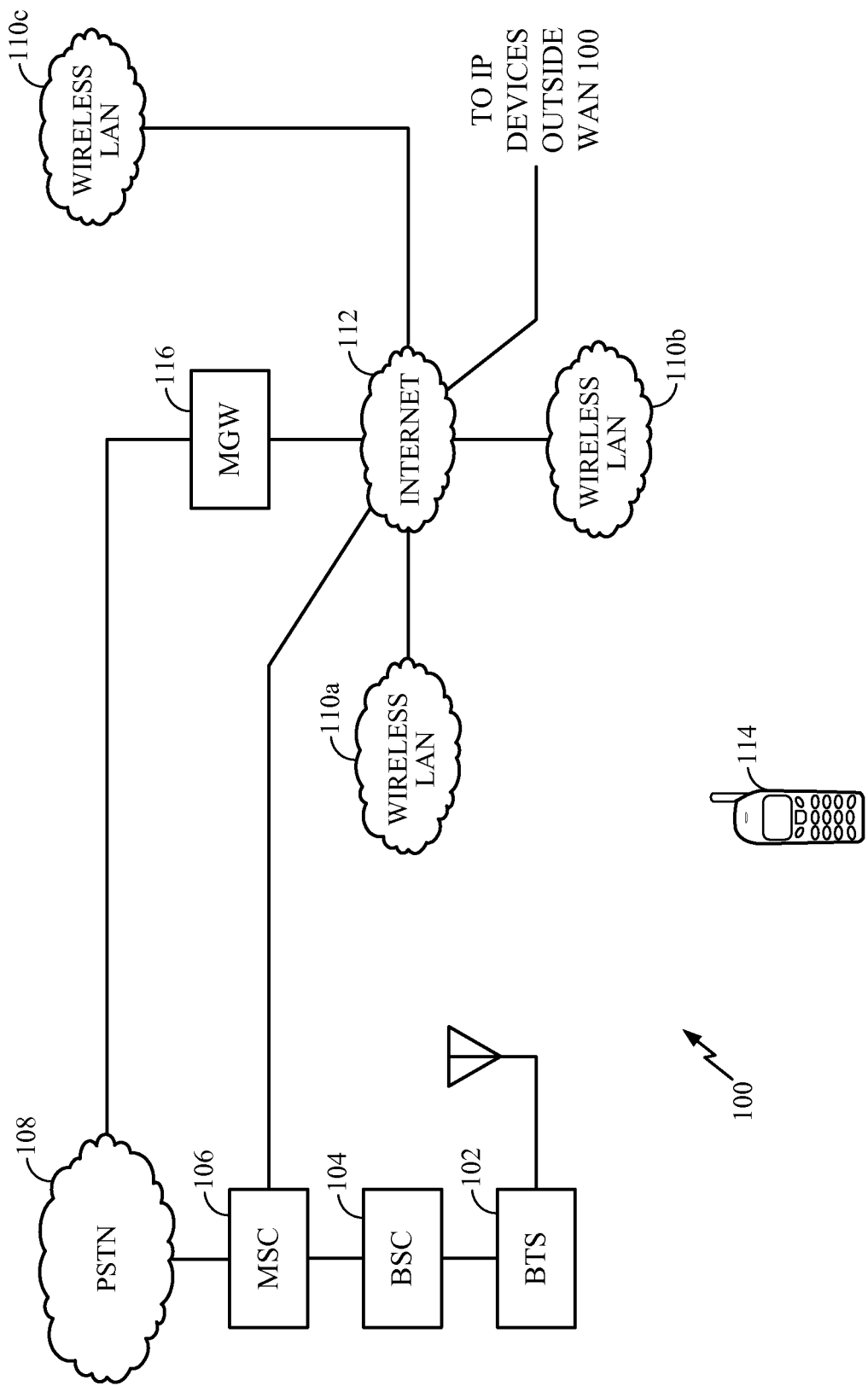
FIG. 1 is a conceptual diagram of a WAN with several wireless LANs dispersed throughout.

FIG. 1 is a conceptual diagram of a cellular WAN. The cellular WAN 100 may employ any number of cells to provide wireless coverage over a geographic region. A BTS may be provided in each cell of the WAN 100 to provide an air interface to wireless communication devices. A BSC may be used to manage and coordinate the BTSs in the WAN 100 and to provide an interface to various packet-based and circuit-switched networks. For illustrative purposes, a single cell is shown in FIG. 1 with a BTS 102 serving all wireless devices under control of a BSC 104. A mobile switching center (MSC) 106 may be used to provide a gateway to a Public Switched Telephone Network (PSTN) 108 and the Internet 112.

Dispersed throughout the cellular WAN 100 are several wireless LANs. For illustrative purposes, three wireless LANs 110a-110c are shown. The wireless LANs 110a-110c may be IEEE 802.11 networks, or any other suitable networks. Each wireless LAN 110a-110c includes one or more access points (not shown) to the Internet 112. The MSC 106, or a Mobile Gateway (MGW) 116, may be used to interface the wireless LANs 110a-110c to the PSTN 108. A wireless communications device 114 can access other IP devices connected to the Internet 112 through a wireless LAN or one or more BTSs in the WAN 100.

The wireless device 114 may be any suitable device capable of both cellular WAN and wireless LAN communications, such as a wireless phone, personal digital assistant (PDA), laptop computer, personal computer (PC), transceiver, modem, camera, game console, or the like. As the wireless device 114 moves throughout the cellular WAN 100, it may pass through the coverage range of one or more wireless LANs 110a-110c.

In principle, the wireless device 114 can detect the presence of each wireless LAN 110a-110c by continuously searching for beacon signals as it moves through the cellular WAN 100. Each time the wireless device 114 detects a wireless LAN, it can decide whether or not to switch over to the wireless LAN to access the PSTN 108. This process, however, requires the wireless device 114 to scan a wide spectrum of frequencies and dedicate significant processor resources to support the search, resulting in increased power consumption and reduced battery life.

A more economical approach in terms of power consumption is to search only when the wireless device 114 is in the vicinity of a wireless LAN suitable for access. Whether or not a wireless LAN is suitable for access will be a determination unique to each wireless device. By way of example, a wireless device may determine that a wireless LAN is suitable for access because it is deployed in the user's home or in his or her office building. The same user may be prohibited from accessing a wireless LAN in the office building of a business competitor or a high security government facility. In some instances, it may not be desirable to access a wireless LAN, which otherwise would allow uninhibited access, that a user passes while traveling along the highway in an automobile. In the latter case, even if the discovery of such a wireless LAN is conducted in a timely fashion, the handoff back and forth between the cellular WAN and the wireless LAN may introduce undesirable latencies and increase the probability of a dropped call.

Figure 2:
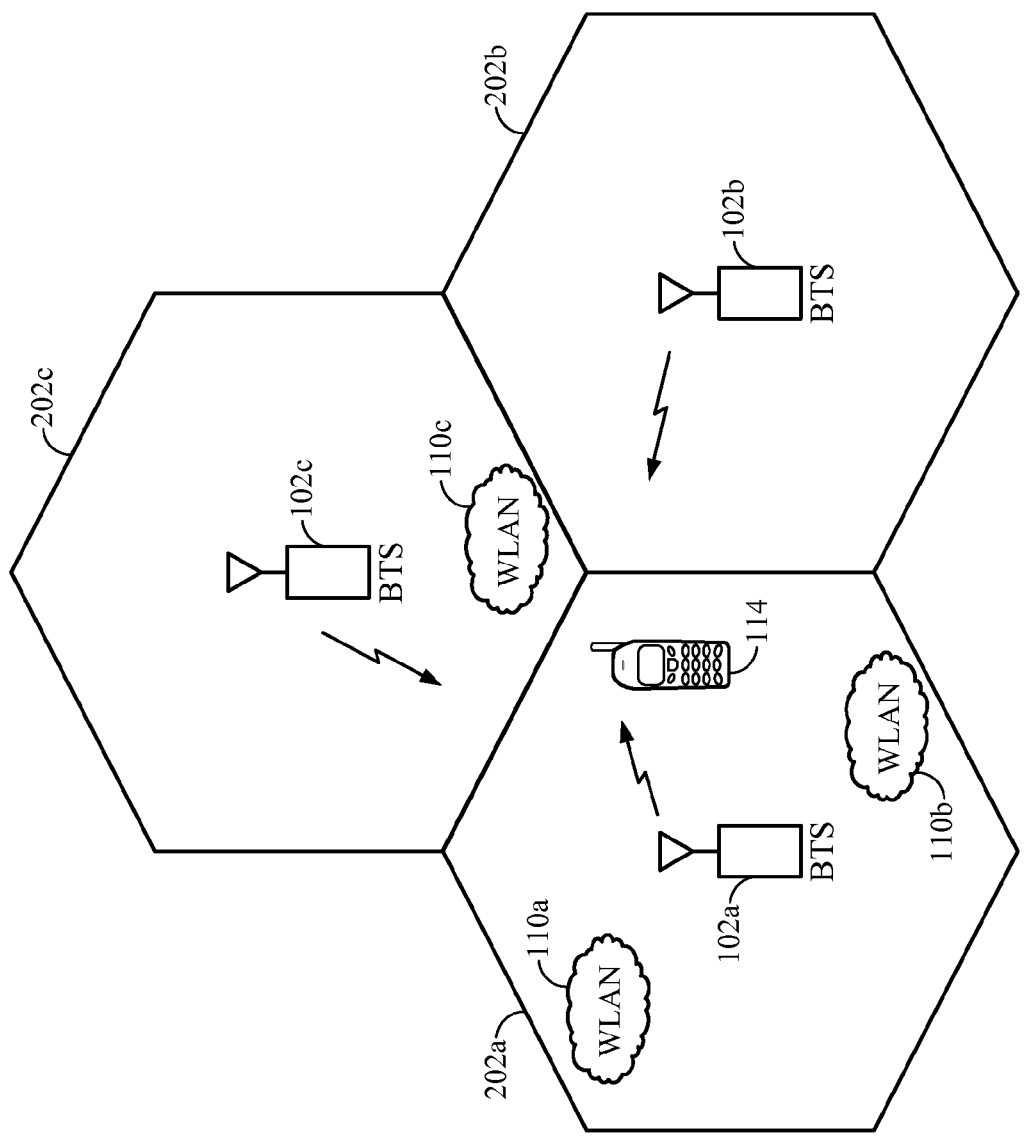
FIG. 2 is a conceptual diagram of a WAN with multiple cells and several wireless WANs dispersed throughout.

An embodiment of a wireless device that searches for a suitable WLAN only when in the vicinity thereof will now be described with reference to FIG. 2. FIG. 2 is a conceptual diagram of a WAN with multiple cells. A BTS 102a-102c is located in each cell 202a-202c, respectively. Each BTS 102a-102c transmits a pilot signal which can be used by the wireless device 114 to synchronize with one or more BTSs and to provide coherent demodulation of the transmitted signal once the wireless device 114 is synchronized to a BTS. The pilot signals may be spread-spectrum signals, or any other type of suitable reference signals. In the case of spread-spectrum pilot signals, each is spread with a different phase offset of the same PN code. The phase relationship may be maintained by synchronizing the pilot signals to a common time reference such as the Navstar Global Positioning satellite navigation system. The different phase offsets allow the wireless device 114 to distinguish between the three BTSs 102a-102c. The wireless device 114 generally establishes a connection with the BTS having the strongest pilot signal.

As the wireless device 114 moves throughout the cellular WAN 100, it monitors the pilot signals from the different BTSs 102a-102c to assist in BTS handoffs as the wireless device 114 crosses cellular boundaries. The pilot signals may also be used to determine the whereabouts of wireless LANs suitable for access by the wireless device 114. By way of example, the wireless device 114 may observe at any particular location with the WAN 100 n BTS pilot signals with measurable signal strength. These pilot signals can be characterized by, one or both of two vectors, $x_1, \ldots, x_n$, and $y_1, \ldots, y_n$, where x is the signal strength of the pilot signal and y is the signal phase of the pilot signal. The pair of vectors is conceptually a fingerprint, or a signature, of the location of the wireless device 114. This fingerprint may be compared against a database containing the fingerprint of each wireless LAN suitable for access. Should the wireless device 114 find a fingerprint in the database that matches its current fingerprint, it can use the information contained in that entry to search for and access the corresponding wireless LAN.

Figure 3:
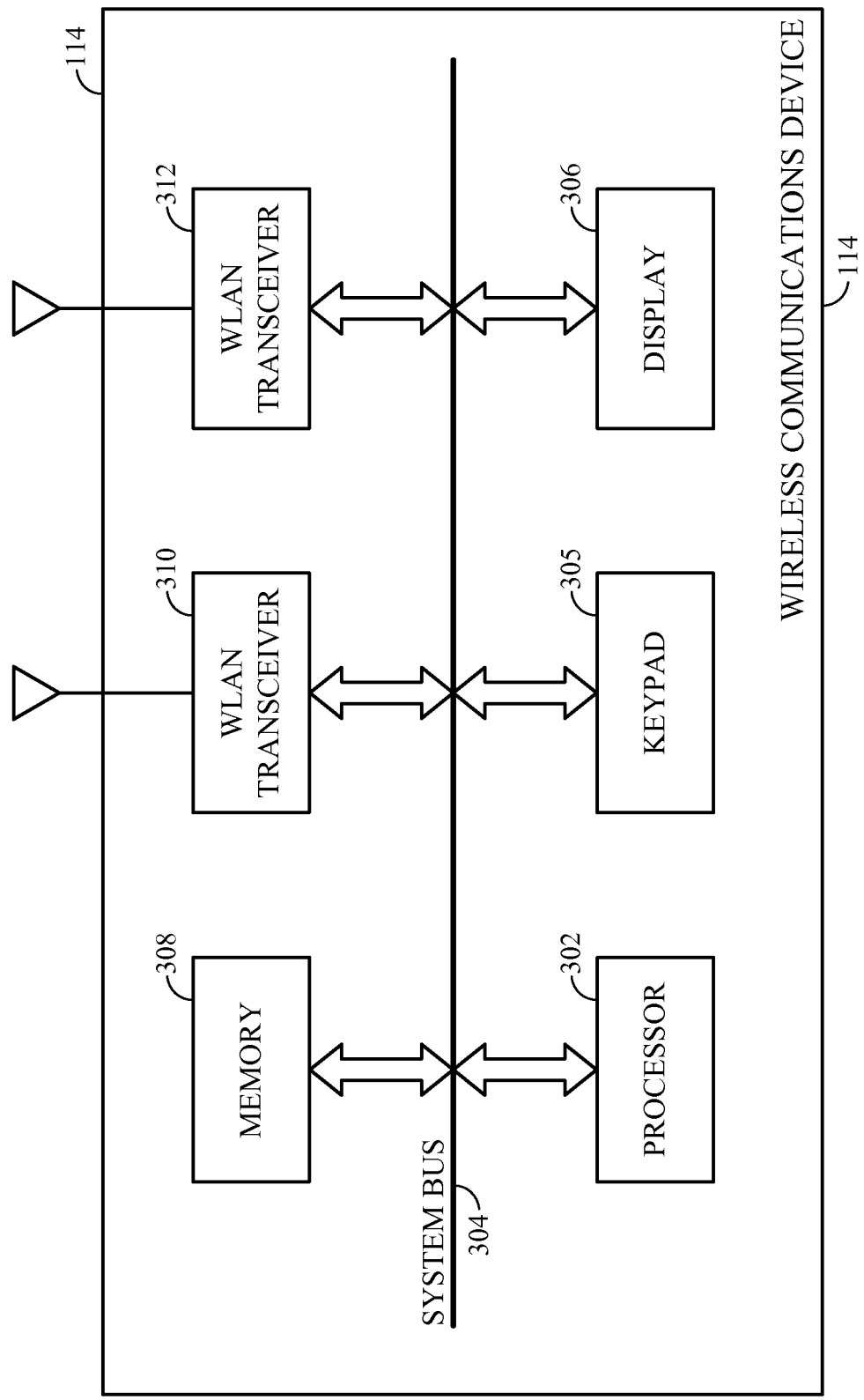
FIG. 3 is a simplified block diagram of a wireless communications device.

FIG. 3 is a simplified block diagram illustrating an example of a wireless device. The wireless device 114 may be implemented in a variety of fashions. In at least one embodiment, the wireless device 114 includes a processor 302 which communicates with a number of peripheral devices via a system bus 304. Although the processor 302 is shown as a single entity for the purposes of explaining the operation of the wireless device 114, those skilled in the art will understand that the functionality of the processor 302 may be implemented with one or more physical processors. By way of example, the processor 302 may be implemented with a microprocessor that supports various software applications. These software applications may be used to control and manage the operation of the wireless device 114, as well as provide an interface to a keypad 305 and display 306. The processor 302 may also include a digital signal processor (DSP) (not shown) that performs certain processing functions. Alternatively, the processor 302 may be implemented with application specific integrated circuits (ASIC), field programmable gate array (FPGA)s, programmable logic components, discrete gates or transistor logic, discrete hardware components, or the like, either alone or in combination with a microprocessor and/or a DSP. Accordingly, the term "processor" is to be construed broadly to cover one or more entities in a wireless device that is capable of processing digital baseband information. The manner in which the processor 302 is implemented will depend on the particular application and the design constraints imposed on the overall system. Those skilled in the art will recognize the interchangeability of hardware, firmware, and software configurations under these circumstances, and how best to implement the described functionality for each particular application.

The peripheral devices may include memory 308. The memory 308 may be implemented in a variety of ways depending on the specific application and the overall design constraints of the wireless device. By way of example, the memory 308 may include a non-volatile permanent storage medium for holding large programs such as the basic input/output system (BIOS) and the operating system. These programs may be loaded into Random Access Memory (RAM), which is also part of the memory 308. Software applications that are launched by the user may also be loaded into RAM from the non-volatile permanent storage medium. The memory 308 may also include caches to further increase the speed of memory access by the processor 302. Those skilled in the art will understand that the term "memory" used throughout this disclosure includes any suitable storage medium, whether such storage medium resides on the processor 302, is external to the processor 302, or is distributed across any number of entities within the wireless device 114.

The wireless device 114 may also include a cellular transceiver 310 and a wireless LAN transceiver 312. In at least one embodiment of the wireless device 114, the cellular transceiver 310 is capable of supporting CDMA2000 1x communications, and the wireless LAN transceiver 312 is capable of supporting IEEE 802.11 communications. In the embodiment shown in FIG. 3, each transceiver 310, 312 has a separate antenna 314, 316, respectively, but the transceivers 310, 312 could share a single broadband antenna, and may comprises a single transceiver or multiple transceivers.

The processor 302 may be configured to maintain a database that includes the fingerprint for each wireless LAN suitable for access by the wireless device 114. The database may be maintained on some non-volatile storage medium in the wireless device 114, and loaded into RAM, cache, and/or general file registers during operation. Along with each fingerprint, the database may include the identity and operating frequency of the corresponding wireless LAN.

The database may be constructed in any number of ways. By way of example, the database may be constructed through a learning process. In one embodiment of a wireless device 114, the learning process may be user initiated. In this embodiment, the wireless device 114 does not initiate a search for an unknown wireless LAN on its own, but permits the user to initiate a search. The user may initiate a search by making one or more entries on the keypad 305, or by depressing a separate key (not shown) on the wireless device 114. When the user initiates a search, the processor 302 scans the frequency of the wireless LAN transceiver 312 in search of a beacon signal from an access point. Should the wireless device 114 detect a beacon signal from a wireless LAN, a fingerprint may be created and stored in the database. The fingerprint of the wireless LAN is created from the list of pilot signals received by the cellular transceiver 310 from the various BTSs in the WAN. An example of a database entry for a wireless LAN fingerprint is shown below.

| WAN ID | WLAN BSS ID | WLAN FREQ. | Signal Strength | Strength Deviation | Phase | Phase Deviation |
|---|---|---|---|---|---|---|
| A | $A_1$ | $F_1$ | $s_1(A_1) \ldots s_n(A_1)$ | $d_1(A_1) \ldots d_n(A_1)$ | $p_1(A_1) \ldots p_n(A_1)$ | $q_1(A_1) \ldots q_n(A_1)$ |

The first column of the table refers to the cellular WAN. Although not discussed, the various concepts described throughout this disclosure may be extended to a communications system with multiple cellular WANs. For example, a wireless device roaming outside its home network territory or in a foreign country may be served by a network other than its home service provider network. The visited WAN would be listed in this first column if a suitable wireless LAN can be accessed by the wireless device. The second column refers to the identity of the wireless LAN, such as the MAC address of the access point or set of access points for the wireless LAN. Typically, the MAC address is included in the beacon signal transmitted by the access point in the wireless LAN, and therefore, is ready available to the wireless device 114. The third column refers to the frequency that the wireless LAN transceiver 312 was tuned to when the processor 302 detected the beacon signal from the access point. The two remaining columns include the values that comprise the fingerprint itself. It includes a signal strength and signal phase measurement for each pilot signal received by the cellular transceiver 310 from the n BTSs in the WAN.

The signal strength or signal phase of the pilot signals that make up the fingerprint may have values that vary (even for the same location) or are difficult to measure with a high degree of accuracy. Thus, a margin can be built into the database to effectively increase the size of the fingerprint. This margin is represented by a "deviation" variable in the fingerprint. An example is shown below for a database entry.

Figure 4:
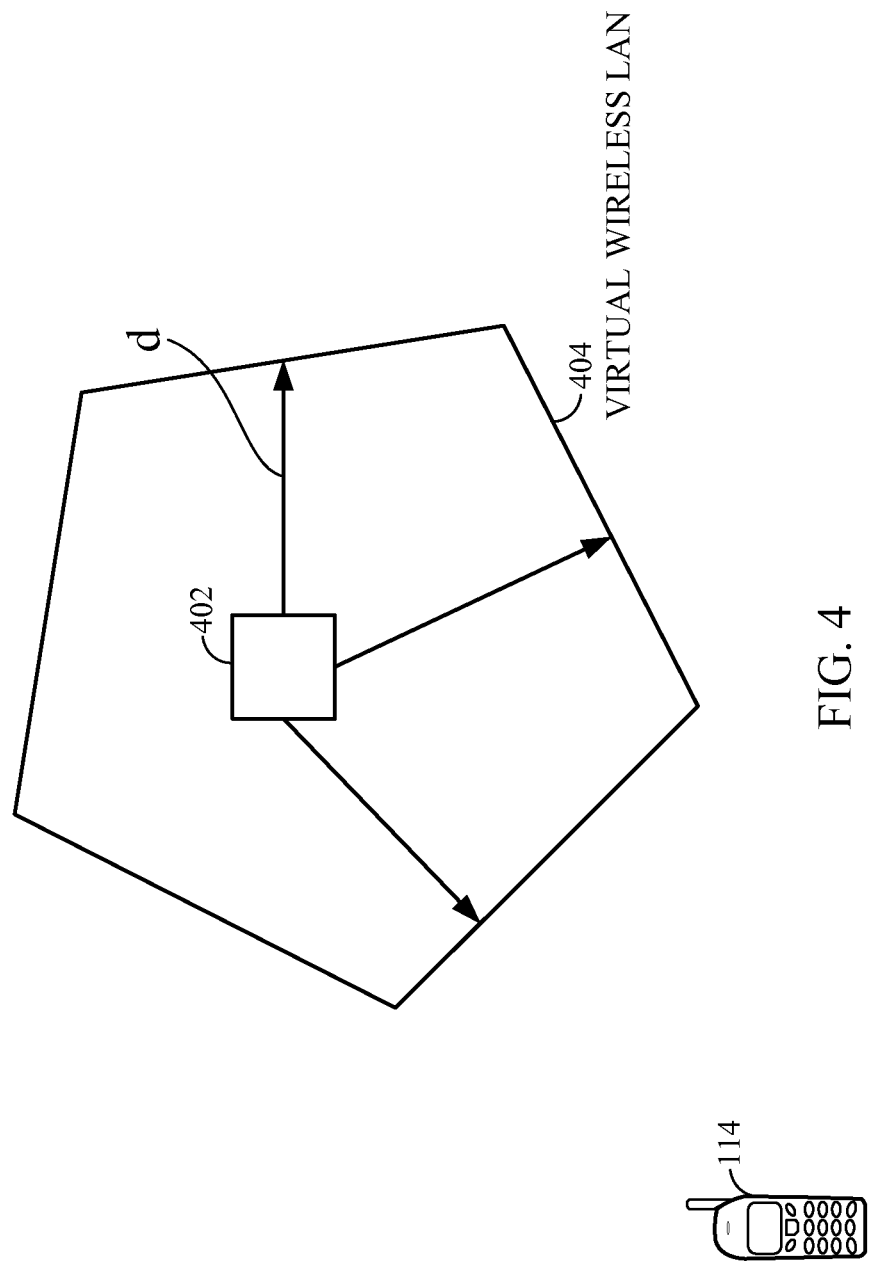
FIG. 4 is a conceptual diagram illustrating a virtual location for an access point in a wireless LAN.

FIG. 4 is a conceptual block diagram illustrating of a wireless device in the vicinity of a wireless LAN suitable for access. The wireless LAN 110 includes an access point 402 located a certain distance from the wireless device 114. A region 404 surrounding the access point 402 indicates the virtual location of the access point 402. The virtual location of the access point 402 can be enlarged by increasing the deviation variables, and similarly reduced by decreasing the deviation variables. The amount of deviation applied to the signal strength and signal phase measurement will vary depending on the particular application and the overall design constraints imposed on the system. A large deviation, for example, may reflect a design decision to place more importance on detecting a wireless LAN at the expense of false alarms that would trigger futile searches for the target wireless LAN. In other words, if the deviation variables in the fingerprint of a wireless LAN result in a significantly large virtual location for the access point 402, then the wireless device 114 may determine that it should search for and access the wireless LAN when it is not within the range of the beacon signal. If, however, the virtual location of the access point 402 is too small, then there may be instances where the wireless device 114 remains connected to the cellular WAN even though it is in the vicinity of a wireless LAN suitable for access.

Instead of, or in addition to, the learning method just described, database entries may be created when a user places a call on the wireless device 114 while in the vicinity of a suitable wireless LAN. Returning to FIG. 3, the processor 302 scans the frequency of the wireless LAN transceiver 312 in search of a beacon signal every time a user places a call on the wireless device 114. If the processor 302 detects a beacon signal, it uses the BTS pilot signals received from the WAN to create a fingerprint of the wireless LAN. The fingerprint, along with the MAC address acquired from the beacon signal and the tuning frequency of the wireless LAN transceiver 312, may then be stored in the database by the processor 302.

The drawback of the latter method is that a fingerprint for every wireless LAN discovered by the processor 302 is created and stored in the database, even if a particular wireless LAN is of no interest to the wireless device 114. By way of example, a user in an automobile moving along a highway may not wish to store in the database a fingerprint for a wireless LAN that he or she happens to be pass while placing a call. To address this situation, the processor 302 may be configured to update the database with a fingerprint for a wireless LAN only when the processor 302 discovers that wireless LAN multiple times within a certain time period. More specifically, when a user places a call on the wireless device 114 in the vicinity of a wireless LAN for the first time, the processor 302 locates the beacon signal and acquires the MAC address for the corresponding access point. However, instead of creating a fingerprint and updating the database, the processor 302 merely logs the MAC address in the memory 308, sets a counter, and time stamps the entry. The next time the user places a call on the wireless device 114 in the vicinity of the same wireless LAN, the processor 302 acquires the MAC address from the beacon signal, and compares the MAC address to existing log entries in the memory 308. If a match is found, the counter is incremented and its output compared to a threshold. If the counter output meets or exceeds the threshold, the processor 302 creates a fingerprint for the wireless LAN, and stores the fingerprint in the database, along with the MAC address and the tuning frequency of the wireless LAN transceiver 312. If, on the other hand, the counter output does not meet the threshold, then the processor 302 does not update the database. Should an excessive amount of time elapse since the time stamp was made, before the counter output reaches the threshold, the counter is decremented, and the time stamp associated with the stale entry removed.

Alternatively, the processor 302 may be configured to update the database with a fingerprint for a wireless LAN only when the processor 302 discovers the wireless LAN while the wireless device 114 is stationary. This method prevents the processor 302 from updating the database with the fingerprint of a wireless LAN that a user in an automobile happens to be passing when a call is placed. The manner in which the wireless device 114 determines whether it is moving or stationary may be implemented in a variety of fashions. By way of example, the processor 302 could monitor the change in phase of the pilot signals received by the cellular transceiver 310. If the phase of the pilot signals change over time, assuming nominal environmental conditions, the processor 302 determines that the wireless device 114 is moving, and therefore, does not update the database with the fingerprint of any wireless LAN that it may discover. If, on the other hand, the phase of the pilot signals are relatively stable, the processor 302 determines that the wireless device 114 is stationary. Once this determination is made, the processor 302 scans the frequency of the wireless LAN transceiver 312 in search of a beacon signal. If successful, the processor 302 acquires the MAC address from the beacon signal, creates a fingerprint using the BTS pilot signals from the WAN, and then enters this information into the database along with the tuning frequency of the wireless LAN transceiver 312.

In an extension of the described learning method, if a wireless LAN has not been found when scanning the wireless LAN transceiver 312 while the wireless device 114 is stationary, the processor 302 does not repeat the scan unless the wireless device 114 has moved sufficient distance from the last unsuccessful scan, and it is determined that the wireless device 114 is once again stationary. This methodology is particularly useful in case the wireless device 114 is moving slowly (e.g. the user is strolling in a shopping mall), and the motion is slow enough that it appears stationary due to the necessary measurement error tolerance associated with the decision to trigger a scan of the wireless LAN transceiver 312.

Another example of a learning methodology that may be employed by the processor 302 involves periodic searches for a wireless LAN. A timer may be used to generate periodic triggers that force the processor 302 into a search mode. In the search mode, the processor 302 scans the frequency of the wireless LAN transceiver 312 in search of a beacon signal from an access point. If the processor 302 detects a beacon signal, it acquires the MAC address for the corresponding access point, creates a fingerprint for the wireless LAN using the BTS pilot signals from the WAN, and enters this information into the database along with the tuning frequency of the wireless LAN transceiver 312. The same conditions discussed earlier may be imposed upon the processor 302 to prevent the database from being updated with wireless LANs that are unsuitable for access by the wireless device 114.

The processor 302 may be further configured to remove from the database fingerprints of wireless LANs that have not been accesses by the wireless device 114 for an extended period of time. This function may be implemented by establishing a counter or timer for each fingerprint in the database. The counter or timer for each fingerprint can be reset every time its corresponding wireless LAN is accessed by the wireless device. In this implementation, the processor 302 periodically deletes from the database all information relating to a wireless LAN whose counter or timer has expired. Alternatively, the processor 302 may time stamp each fingerprint in the database every time its corresponding wireless LAN is accessed. With this latter approach, the processor 302 maintains real time clock or can otherwise receive real time (for example from the WAN), and deletes information in the database for each wireless LAN having an aged time stamp.

The wireless device 114 may also be pre-provisioned with the fingerprint of one or more wireless LANs. That is, the fingerprint for a wireless LAN, along with the MAC address for the corresponding access point and the operating frequency of the wireless LAN, may be programmed into the database when the wireless device 114 is activated by the service provider. Pre-provisioning may be useful, for example, when a business issues wireless telephones to all its employees.

Returning to FIG. 1, the wireless device 114 maintains a fingerprint of its current location from the BTS pilot signals in the WAN 100. This fingerprint changes as the wireless device 114 moves. As discussed earlier, the fingerprint for the wireless device 114 created from n BTS pilot signals can be characterized by two vectors, $x_1, \ldots, x_n$, and $y_1, \ldots, y_n$. The fingerprint of the wireless device 114 is continuously, or periodically, compared against the fingerprints in the database for a match using a suitable algorithm. The algorithm that is used may vary depending upon the performance parameters and the overall design constraints imposed on the system. For the purposes of illustration, an example of an algorithm is provided below.

$|x_i-s_i|<d_i$ and $|y_i-p_i|<q_i$, for i=1, ..., n.

If the above condition is satisfied for all n values for a database entry, the processor in the wireless device 114 then checks to see if the following condition is satisfied:

SUM$|x_i-s_i|<X$ or SUM$|y_i-p_i|<Y$, where X and Y are threshold values.

If either of the latter conditions are satisfied for the database entry, then the wireless device 114 tunes the wireless LAN transceiver to the appropriate operating frequency and searches for a beacon signal with the appropriate MAC address. As discussed earlier, the operating frequency and MAC address are stored in the database for each wireless LAN fingerprint.

Once the wireless device 114 locates the wireless LAN 110b, it sends a handoff request to a server (not shown) on the IP network 112. The server sends a handoff message to the MSC 106. The handoff message is used by the MSC 106 to notify the BTS 102 of the handoff to the wireless LAN 110b. The server also sends a handoff command to the wireless device 114. In response to the handoff command, the wireless device 114 tears down the existing air interface with the BTS 102 and establishes a new air interface with the access point in the wireless LAN 110b. Once the new air interface is established with the access point in the wireless LAN 110b, the server signals the MSC 106 to indicate that the handoff is complete. The wireless device 114 can now support cellular services using the wireless LAN 110b.

The wireless device 114, while being served by the wireless LAN 110b, may periodically tune into the WAN and compare parameters in the wireless LAN fingerprint with the measurements while within the confines in the wireless LAN 110b coverage region. These measurements may be used to update the fingerprint information for wireless LAN 110b, e.g. to adjust boundaries by broadening phase deviation vectors. The frequency of these periodic measurements can be relatively low when the wireless LAN signal is strong, and should increase as the signal weakens, possibly indicating edge of the wireless LAN coverage region.

As the wireless device 114 moves through the coverage region of the wireless LAN 110b, the wireless LAN signal strength that it measures may vary as a function of distance from the wireless LAN access point, obstacles on the radiation path, antenna radiation patterns and other factors. Should the signal strength measured at the wireless device 114 fall below a threshold, the wireless device 114 may initiate a handoff back to the cellular WAN 100. The handoff back to the cellular WAN 100 may be initiated by the wireless device 114 by sending a handoff request to a server (not shown) on the IP network 112. Having maintained synchronization with the WAN 100 by means of taking occasional measurements of the WAN 100 while being served by the wireless LAN 110b, the mobile device 114 knows the target BTS or set of BTSs which will be involved in the handoff. This is information is passed to the server. The server sends a handoff message to the MSC 106 as part of the handoff procedure. The handoff message is used by the MSC 106 to find a target BTS. The target BTS may be the BTS 102 shown in FIG. 1, or any other BTS in the cellular WAN 100. The MSC 106 then notifies the target BTS to prepare resources for the handoff and sends a handoff command back to the server. In response to the handoff command, the server instructs the wireless device 114 to move to the target BTS. The wireless device 114 accomplishes this by tearing down the existing air interface with the access point in the wireless LAN 110b and establishing air interface with the target BTS. Once the air interface is established with the target BTS, the target BTS signals the MSC 106 to indicate that the handoff is complete, and the wireless device 114 resumes use of the cellular WAN 100.

Figure 5:
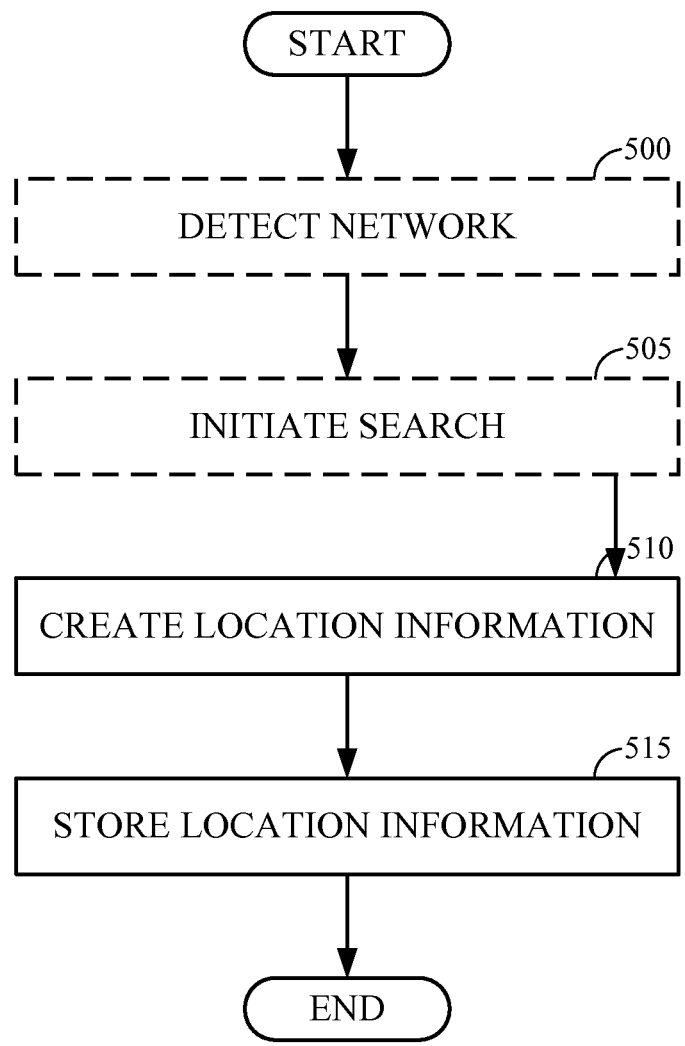
FIG. 5 is a conceptual diagram of a process for creating location information.

FIG. 5 is a conceptual diagram of a process for creating location information. A search for a first communication network is initiated, block 500. The first communication network may be a WLAN. The search for the first communication network may be initiated, at the wireless communication device, when a call over a WAN is placed from the wireless communication device. Alternatively, the search may be periodic, or based upon one or more other criteria. After initiation of the search, one or more access points of the WLAN network may be detected, block 505. In some aspects, the detection may be based upon receiving beacons from one or more access points, during a search period. Other detection mechanisms may also be utilized.

The location information for the access points may then be generated, block 510. The location information may include a fingerprint, including one or of signal strength, signal strength deviation, phase, and/or phase deviation information. Additional and alternative information, including, for example, frequency and BSS ID for an access point, may also be utilized as part of the location information. The resulting information is then stored in a memory, block 515.

In the case, where no network is detected, the process terminates. Also, it should be noted that blocks 500 and 505 are optional, for the creation of location information.

FIG. 6 is another simplified block diagram wireless communication device. A means for creating location information 610 is coupled with a memory 615 that stores the location information. The location information may be any of the location information of a WLAN network with respect to a WAN network, as described herein. In some aspects, a means for determining network locations 600, including a means for initiating a search for a network 605, may be coupled with the mans for creating location information 610.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in one or more instructions executed by a processor, or in a combination of the two. The software may reside as one or more instructions in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

The previous description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but is to be accorded the full scope consistent with the language claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A wireless communications device, comprising:
a processor configured to create information relating to a location of a first communications network based on one or more reference signals from a second communications network, the information comprising a fingerprint of the first communications network and a margin to increase a size of the fingerprint, wherein the fingerprint comprises phase information and signal strength information for the one or more reference signals; and
memory configured to store the information.

2. The wireless communications device of claim 1, wherein the fingerprint further comprises an operating frequency of an access point in the first communications network.

3. The wireless communications device of claim 1, wherein the processor is further configured to delete the information from the memory after a time period has passed since the processor last accessed the first communications network.

4. The wireless communications device of claim 1, wherein the first communications network is a local area network (LAN) and the second communications network is a wide area network (WAN).

5. Non-transitory computer-readable media including instructions executable by one or more processors, the instructions comprising:
instructions for creating information relating to a location of a first communications network based on one or more reference signals from a second communications network, the information comprising a fingerprint of the first communications network and a margin to increase a size of the fingerprint, wherein the fingerprint comprises phase information and signal strength information for the one or more reference signals; and instructions for storing the information in a memory.

6. The non-transitory computer-readable media of claim 5, wherein the fingerprint further comprises an operating frequency of an access point in the first communications network.

7. The non-transitory computer-readable media of claim 5, the instructions further comprising instructions for deleting the information after a time period has passed since accessing the first communications network.

8. The non-transitory computer-readable media of claim 5, wherein the first communications network is a local area network (LAN) and the second communications network is a wide area network (WAN).

9. A method, comprising:
creating information relating to a location of a first communications network based on one or more reference signals from a second communications network, the information comprising a fingerprint of the first communications network and a margin to increase a size of the fingerprint, wherein the fingerprint comprises phase information and signal strength information for the one or more reference signals; and
storing the information in a memory.

10. The method of claim 9, wherein the fingerprint further comprises an operating frequency of an access point in the first communications network.

11. The method of claim 9, further comprising deleting the information after a time period has passed since accessing the first communications network.

12. The method of claim 9, wherein the first communications network is a local area network (LAN) and the second communications network is a wide area network (WAN).

13. A wireless communications apparatus, comprising:
means for creating information relating to a location of a first communications network based on one or more reference signals from a second communications network, the information comprising a fingerprint of the first communications network and a margin to increase a size of the fingerprint, wherein the fingerprint comprises phase information and signal strength information for the one or more reference signals; and
means for storing the information in a memory.

14. The wireless communications apparatus of claim 13, wherein the fingerprint further comprises an operating frequency of an access point in the first communications network.

15. The wireless communications apparatus of claim 13, further comprising means for deleting the information after a time period has passed since accessing the first communications network.

16. The wireless communications apparatus of claim 13, wherein the first communications network is a local area network (LAN) and the second communications network is a wide area network (WAN).

* * * * *